(12) United States Patent
Ao

(10) Patent No.: US 6,411,753 B1
(45) Date of Patent: Jun. 25, 2002

(54) M×N OPTICAL MATRIX SWITCH

(75) Inventor: Eric Rong Ao, Nepean (CA)

(73) Assignee: JDS Uniphase Inc., Ottawa (CA)

(*) Notice: Subject to any disclaimer, the term of this patent is extended or adjusted under 35 U.S.C. 154(b) by 98 days.

(21) Appl. No.: 09/648,625

(22) Filed: Aug. 28, 2000

(51) Int. Cl.[7] .............................. G02B 6/26; G02B 6/42
(52) U.S. Cl. ............................ 385/17; 385/16; 385/18; 385/19; 385/20; 359/128
(58) Field of Search ............................ 385/17, 18, 20, 385/21, 16, 19; 359/128

(56) References Cited

U.S. PATENT DOCUMENTS 5,841,917 A * 11/1998 Jungerman .................. 385/17

2001/0024548 A1 * 9/2001 Hamanaka .................. 385/17

* cited by examiner

Primary Examiner—Cassandra Spyrou
Assistant Examiner—Leo Boutsikaris
(74) Attorney, Agent, or Firm—Neil Teitelbaum

(57) ABSTRACT

An M×N optical switch in which the focal lengths of the collimating lenses are adjusted so that the waists of the Gaussian beams exiting the collimating lenses are focused on reflecting elements, which are positioned along a diagonal of the array of reflecting elements. This arrangement increases the number of beams that are symmetrical about the waist position, which increases the coupling efficiency. The best possible arrangement occurs when all of the waists are equal in diameter, thereby ensuring that for every output port the distances from the waists to the focusing lens are identical.

24 Claims, 5 Drawing Sheets

M×N OPTICAL MATRIX SWITCH

BACKGROUND OF THE INVENTION

The present invention relates to an optical matrix switch, and in particular to an optical matrix switch with improved coupling efficiency.

Conventional optical matrix switches, such as the ones disclosed in U.S. Pat. No. 4,580,873 issued Apr. 8, 1986 to Frank Levinson, include a linear array of collimating lenses (e.g. graded index lenses) mounted perpendicularly to a linear array of receiving lenses with a two-dimensional array of reflecting elements mounted therebetween. In use, optical fibers are connected to each of the lenses, and the reflecting elements are selectively actuated for directing light signals, exiting from the collimating lenses, to the desired receiving lenses. Accordingly, any light signal entering the switch through the input optical fibers can be directed to any one of the output optical fibers. However, coupling losses varied greatly depending upon which output optical fiber was selected, due to the variances in the signal path lengths from the input optical fibers.

Various devices have been developed in an attempt to improve the efficiency of the signal transfer, such as the switch disclosed in U.S. Pat. No. 5,841,917, issued Nov. 24, 1998 to Roger Jungerman et al. In this switch, the input optical fibers and the output optical fibers are staggered, thereby ensuring that all of the signal path lengths through the switch are equal. This is important because the best coupling efficiency occurs when the system is symmetrical and the Gaussian beam waist is centered between the two lenses. Unfortunately, this switch is quite bulky, relatively difficult to install, and relatively expensive to manufacture.

An object of the present invention is to overcome the shortcomings of the prior art by providing an optical matrix switch with minimal coupling loss variation.

SUMMARY OF THE INVENTION

Accordingly, the present invention relates to an M×N optical switch comprising:

a first substantially linear array of collimating lenses defining input ports for transmitting light beams from input waveguides, each light beam having a waist along its length, at which the beam's diameter is at a minimum;

a second substantially linear array of focusing lenses defining output ports for receiving the light beams from the first array of lenses and transmitting the light beams to output waveguides; and a two-dimensional array of M×N controllable elements aligned between the two arrays of lenses at respective intersection points of the light beams, whereby in a first state a controllable element will redirect a light beam from an input port to an output port, and whereby in a second state the controllable element allows a light beam to pass unobstructed;

wherein a plurality of the collimating lenses, which transmit light via a P×P array of the controllable elements, are adapted to focus the waists of the light beams being transmitted thereby onto respective controllable elements, which are disposed on a diagonal line extending across the P×P array of the controllable elements, in which P≦the lesser of M and N.

BRIEF DESCRIPTION OF THE DRAWINGS

The invention will be described in greater detail with reference to the accompanying drawings, which illustrate a preferred embodiment of the invention, wherein.

DETAILED DESCRIPTION

Figure 1:
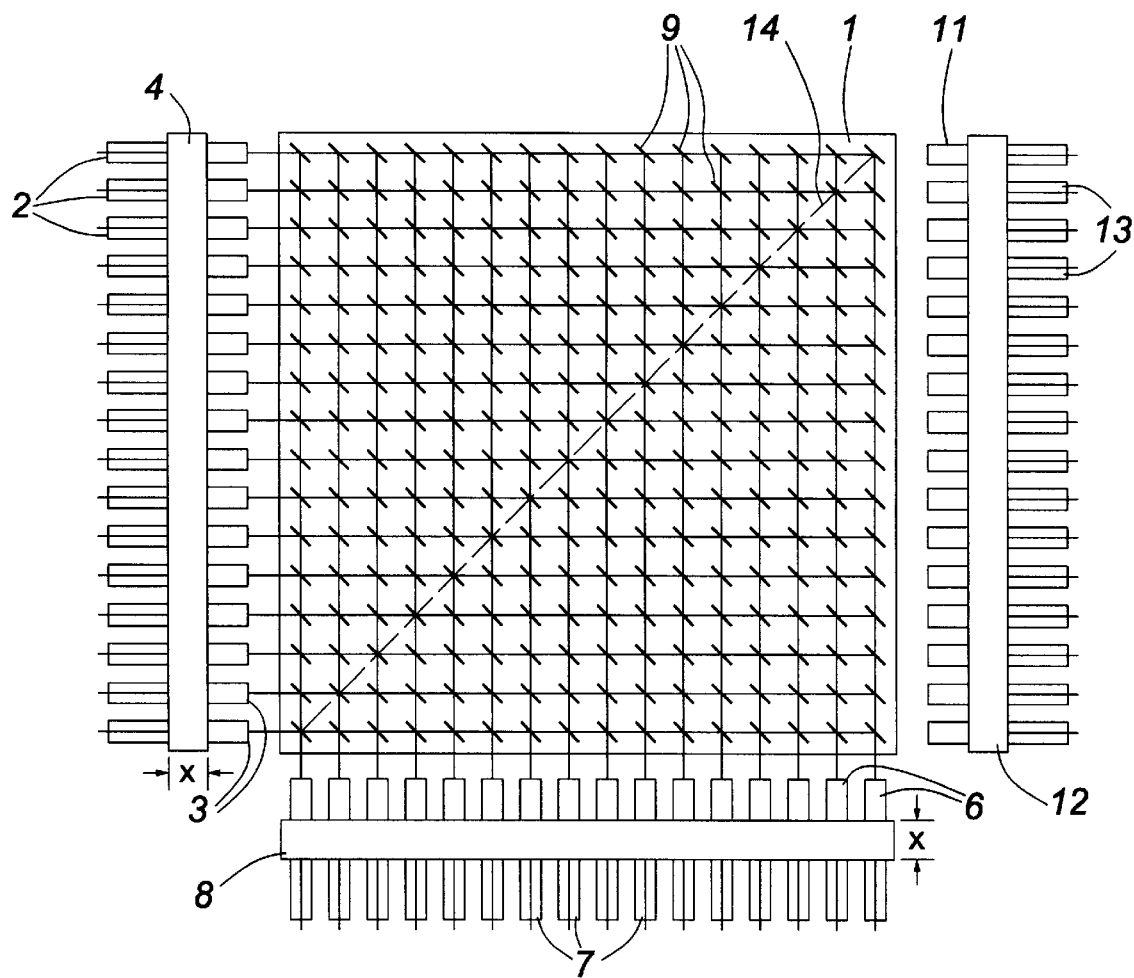
FIG. 1 is schematic top view of a conventional optical matrix switch.

The conventional 16×16 optical matrix switch, illustrated in FIG. 1, includes a substrate 1 (typically a semiconductor substrate) which is adapted to receive sixteen optical waveguides 2. Each of the optical waveguides 2 is connected to a collimating lens 3. In the illustrated switch all of the lenses 3 are identical graded index (grin) lenses connected to the optical waveguides 2 via a rectangular glass spacer 4. The glass spacer defines a fiber-lens gap x.

A linear array of focusing lenses 6 is connected to the substrate 1, orthogonal to the array of collimating lenses 3. Similar to the collimating lenses, the focusing lenses 6 (grin lenses) are connected to a linear array of output optical waveguides 7 via a rectangular glass spacer 8, which also defines a gap x.

Controllable elements 9, defining a two-dimensional array, are pivotally mounted on the substrate 1 for selectively directing beams of light entering the switch through one of the collimating lenses 3 to one of the focusing lenses 6. Another linear array of focusing lenses 11 are mounted directly opposite the collimating lenses 3 for receiving the light signals that pass through the switch unobstructed. A rectangular glass block 12 is mounted between the lenses 11 and optical fibers 13.

Since all of the collimating lens 3 are identical and the gap x is the same for each lens 3, the waist of the Gaussian beam of light will be focused on a single column of the reflecting elements 9. Typically one of the middle columns is chosen, but experiments have been performed to identify the insertion loss related to focusing the beam waist on the first and the last column. See FIGS. 4, 5 and 6 for comparative results. However, none of these options is particularly good at reducing the coupling loss for every port.

Figure 2:
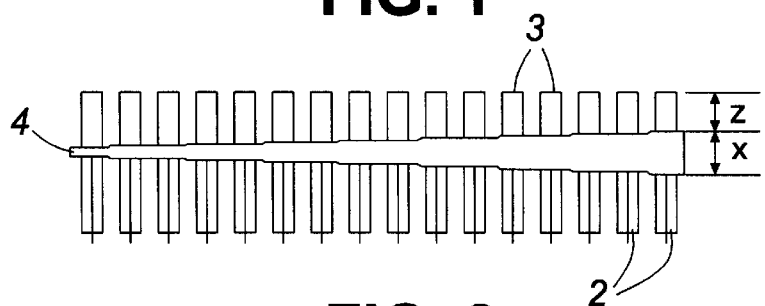
FIG. 2 is a schematic top view of the linear array of lenses illustrating the varying lens length and varying gap length.

The present invention, illustrated in FIG. 2, will be discussed with reference to the conventional switch illustrated in FIG. 1. However, any form of optical switch could be used along with any number of input/output ports, any type of focusing and collimating lens, any kind of waveguide, and any kind of controllable element. In practice, the switch is a bi-directional switch, wherein the lenses 3 and 6 can both collimate and focus the light depending on which direction the light is travelling. However, for convenience, the lenses 3 will be described as collimating lenses and the lenses 6 will be described as focusing lenses.

According to the present invention, to obtain improved results, the beam waists are focused on the controllable elements positioned along a diagonal 14 of the array of controllable elements 9. This arrangement lowers the port-dependent coupling-loss variation by increasing the number of beam paths that are symmetrical, i.e. with the beam waist at the center between the two lenses. To achieve this result, the focal lengths of the collimating lenses 3 must gradually increase from one end of the array of focusing lenses 3 to the other. Accordingly, the diagonal 14 extends from the reflecting element closest to the collimating lens with the shortest focal length.

To obtain optimum efficiency in the switch all of the collimating lenses are adapted to focus the beam waists on the controllable elements 9 along the diagonal 14. However, the invention can be implemented into an M×N switch, in which only a P×P section of the switch is optimized, where P≦the lesser of N and M.

In practice, when a graded index (grin) lens is used, the focal length can be adjusted by adjusting the length of the lens. Accordingly, the lenses are arranged so that they gradually decrease in length from one end of the array to the other. Alternatively, the gap x, between the lenses 3 and the optical waveguides 2, can be adjusted to change the resulting position of the beam waist; i.e. the gap x can be gradually increased from one end of the array to the other.

To minimize the overall size of the switch and to ensure that the dimensions of the beam are kept within practical limits, the grin lenses are all less/than ¼ pitch.

Figure 3:
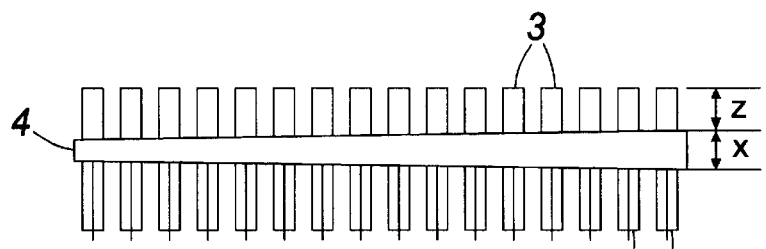
FIG. 3 is a schematic top view of the linear array of lenses illustrating the varying lens lengths the varying gap length with a wedge-shaped gap.

The gap x can be defined by an air gap created between the waveguides and lenses or by a solid piece of glass, shaped accordingly. When the spacer 4 is made of glass, a wedge-shaped spacer (FIG. 3) can be used instead of a stepped spacer (FIG. 2), to minimize construction costs.

In a preferred embodiment of the present invention, the focal lengths of the focusing lenses are adjusted to correspond with the focal lengths of the respective collimating lenses, thereby increasing the coupling efficiency; i.e. the lens and/or gap of the first input port, which is closest to the output ports, is adapted substantially the same as the gap and/or lens of the first output port, which is closest to the input ports.

In an optimum configuration, all of the beam waists have substantially equal diameters, whereby for a given output port the distances from the focusing lens to the waists of all the input beams are the same, which ensures the best coupling efficiency. Obviously, in this case extensive calculations are necessary to ensure that all of the waists are focused along the diagonal 14 and that all the waists are the same size. In a preferred embodiment, wherein grin lenses are used, both the gap x and the length of the lenses 3 are varied to ensure the desired outcome.

Before calculating the various lens and gap lengths for a sample calculation, several assumptions must be made. For example, it is assumed that the pitch of the controllable element matrix is 1.25 mm, that the minimum space between the lens and the controllable element is 3.0 mm, and that the wavelength of the beam λ=1550 nm. Furthermore, since 0.400 mm diameter mirrors are to be used as controllable elements, a beam waist radius of 0.110 mm is selected so that a beam size of 0.414 mm will result on the farthest mirror.

To calculate the required lengths, an ABCD matrix optics technique is used. When a Gaussian beam with q-parameter $q_o$ travels through an optical system, which can be described by an ABCD 2×2 optical matrix, the q-parameter of the output Gaussian beam is $$q=(Aq_o+B)/(Cq_o+D)$$

A, B, C, and D can be expressed as functions of the length of the lens Z, the gap X between the lens and the waveguide, and the port number ip. The $q_o$ is the q-parameter of the beam from the input waveguide. With these parameters the q-parameter of the Gaussian beam at the diagonals can be calculated as a function of Z, X and ip. By solving the following pair of equations:

$Re(q(Z,X,ip)=0$ positioning the waist at the diagonal $W(Z,X,ip)=\{-\lambda/(\pi Im(1/q(Z,X,ip)))\}^{1/2}$ the following table of lens length and gap X can be calculated. In practice, fine adjustments to the gap X can be made by manipulating the thickness of the glue, which is used to connect the various elements together.

| Channel | X(mm) in glass | Z(mm) | Waist Position |
|---|---|---|---|
| 1 | 0.792 | 1.864 | 3.00 |
| 2 | 0.825 | 1.840 | 4.25 |
| 3 | 0.864 | 1.811 | 5.50 |
| 4 | 0.906 | 1.780 | 6.75 |
| 5 | 0.959 | 1.741 | 8.00 |
| 6 | 1.019 | 1.698 | 9.25 |
| 7 | 1.079 | 1.656 | 10.50 |
| 8 | 1.138 | 1.616 | 11.75 |
| 9 | 1.208 | 1.570 | 13.00 |
| 10 | 1.282 | 1.523 | 14.25 |
| 11 | 1.348 | 1.483 | 15.50 |
| 12 | 1.428 | 1.436 | 16.75 |
| 13 | 1.498 | 1.397 | 18.00 |
| 14 | 1.578 | 1.354 | 19.25 |
| 15 | 1.658 | 1.313 | 20.50 |
| 16 | 1.734 | 1.276 | 21.75 |

When the switch includes more input ports than output ports, for the sake of beam waste calculation, the extra collimating lenses are adapted to focus the waists of the light beams emanating therefrom onto respective imaginary controllable elements positioned along the diagonal line 14 outside the actual switch. This ensures that, when a light beam is transmitted via these extra input ports, the beam waist will still be focused on one of the existing reflecting elements 9 positioned along the diagonal 14. Moreover, for each output port the distance from the beam waists to the focusing lens are identical.

Similarly, the switch is effective when there are more output ports than input ports, since even for these extra output ports the distances from the beam waists-to the focusing lenses are identical.

Figure 4:
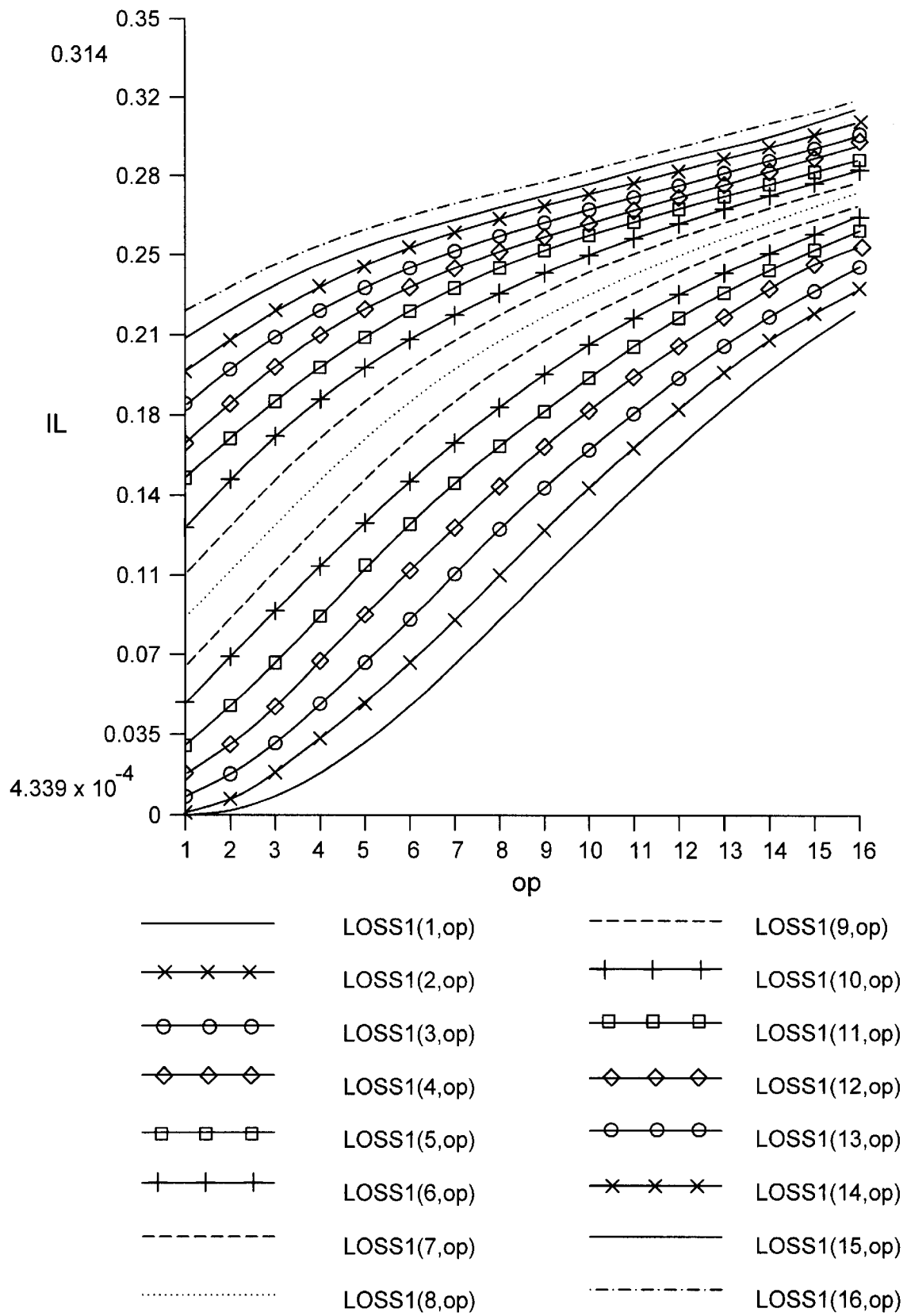
FIG. 4 is graph showing the insertion loss for a conventional switch when the beam waist is focused on the first column of mirrors.
Figure 5:
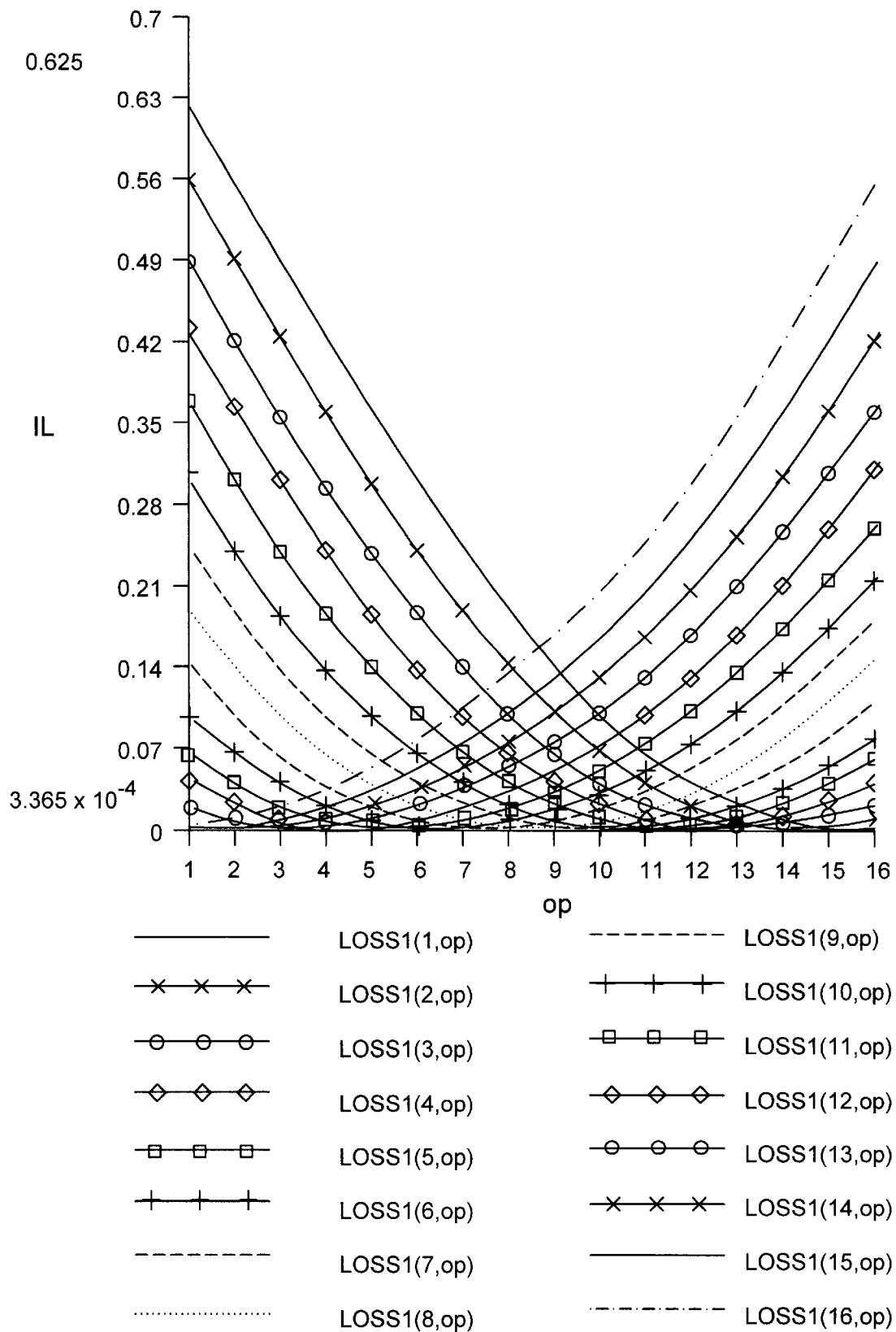
FIG. 5 is a graph showing the insertion loss for a conventional switch when the beam waist is focused on the eighth column of mirrors.
Figure 6:
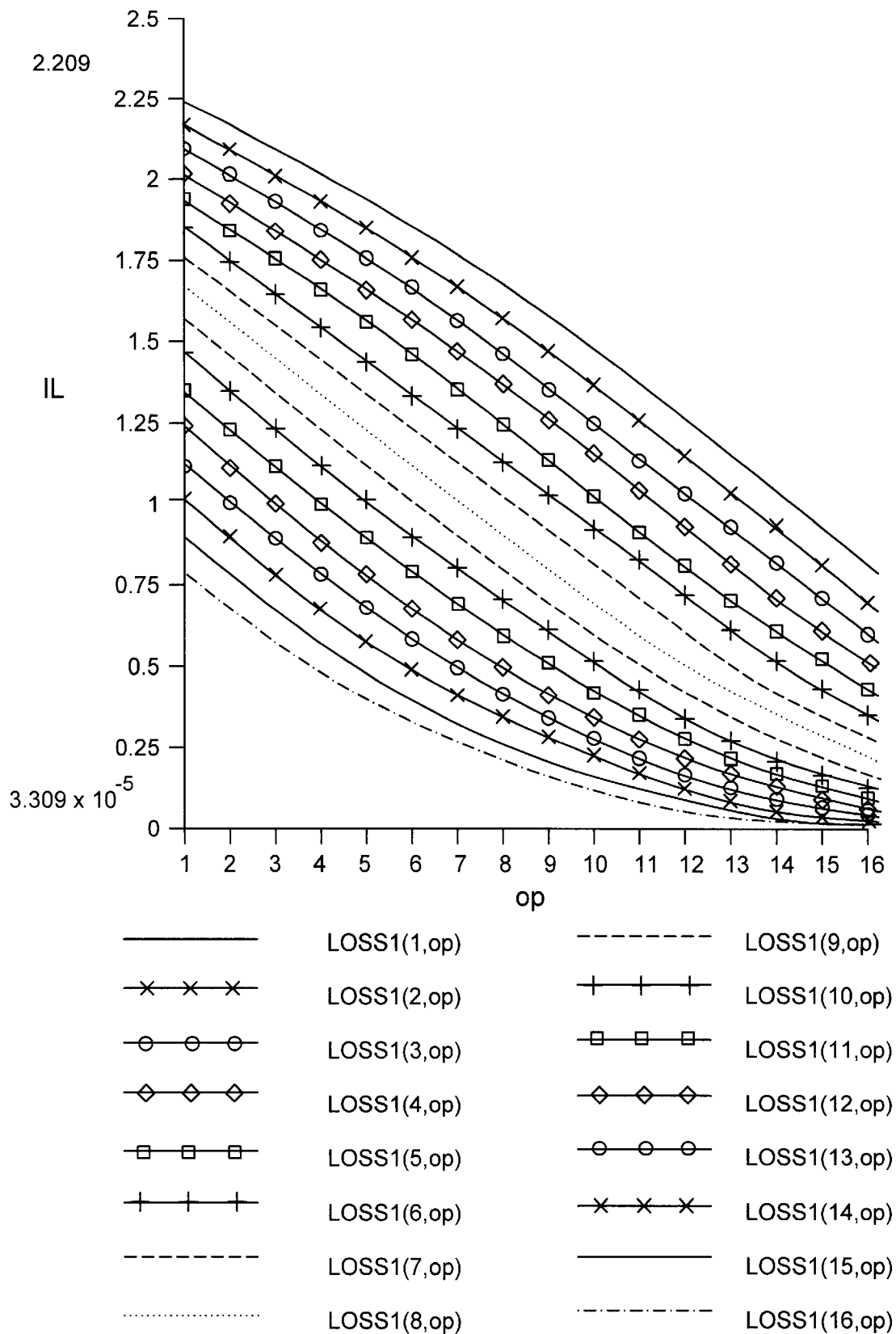
FIG. 6 is a graph showing the insertion loss for a conventional switch when the beam waist is focused on the sixteenth column of mirrors.
Figure 7:
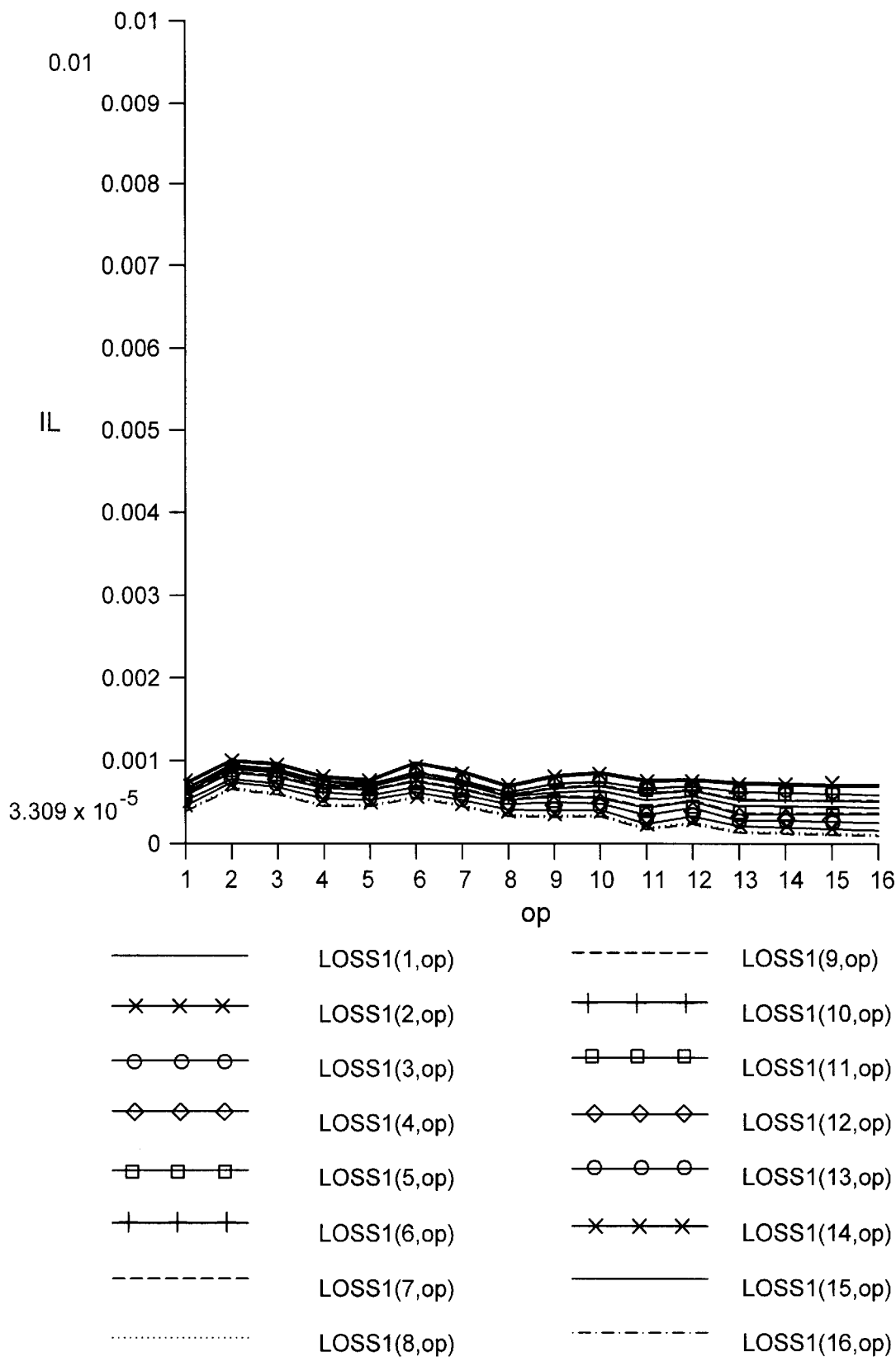
FIG. 7 is a graph showing the insertion loss for the switch of the present invention with the beam waist focused on the mirrors along the diagonal.

FIGS. 4, 5 and 6 have been provided to illustrate the results of other experiments in which the beam waists were focused on the first, eighth, and sixteenth column of reflecting elements, respectively By comparing the insertion loss results (FIG. 7) from the switch designed according to the present invention with those of various other experimental arrangements (FIGS. 4, 5, and 6), it is obvious that the switch of the present invention greatly reduces the port-dependent coupling-loss variation.

What I claim is:
1. An M×N optical switch comprising:
  a first substantially linear array of collimating lenses defining input ports for transmitting light beams from input waveguides, each light beam having a waist along its length, at which the beam's diameter is at a minimum;

a second substantially linear array of focusing lenses defining output ports for receiving the light beams from the first array of lenses and transmitting the light beams to output waveguides; and a two-dimensional array of M×N controllable elements aligned between the two arrays of lenses at respective intersection points of the light beams, whereby in a first state a controllable element will redirect a light beam from an input port to an output port, and whereby in a second state the controllable element allows a light beam to pass unobstructed;

wherein a plurality of the collimating lenses, which transmit light via a P×P array of the controllable elements, are adapted to focus the waists of the light beams being transmitted thereby onto respective controllable elements, which are disposed on a diagonal line extending across the P×P array of the controllable elements, in which P≦the lesser of M and N.

2. The optical switch according to claim 1, wherein a plurality of the collimating lenses have different focal lengths, and wherein the focal lengths of the collimating lenses gradually increase from one end of the first array to the other, whereby the diagonal line extends from the controllable element closest to the collimating lens with the shortest focal length.

3. The optical switch according to claim 2, wherein one or more of the collimating lenses comprises a graded index lens.

4. The optical switch according to claim 3, wherein a plurality of the graded index lenses have different lengths, and wherein the lengths of the graded index lenses gradually decrease from one end of the first array to the other, whereby the waists of the light beams are focused on the respective controllable elements along the diagonal line.

5. The optical switch according to claim 3, wherein a gap is provided between a plurality of the graded index lenses and their corresponding input waveguides; wherein a plurality of the gaps have different lengths; and wherein the gaps gradually increase in length from one end of the first array to the other, whereby the waists of the light beams are focused on the respective controllable elements along the diagonal line.

6. The optical switch according to claim 1, wherein a plurality of the waists have substantially equal diameters.

7. The optical switch according to claim 6, wherein a plurality of the collimating lenses have different focal lengths, and wherein the focal lengths of the lenses gradually increase from one end of the first array to the other, whereby the diagonal line extends from the controllable element adjacent to the collimating lens with the shortest focal length.

8. The optical switch according to claim 7, wherein one or more of the collimating lenses comprises a graded index lens.

9. The optical switch according to claim 8, wherein a plurality of the graded index lenses have different lengths; wherein the lengths of the graded index lenses gradually decrease from one end of the first array to the other; wherein a gap is provided between a plurality of the graded index lenses and their corresponding input waveguides; wherein a plurality of the gaps have different lengths; and wherein the gaps gradually increase in length from one end of the first array to the other; whereby the lengths of the lenses and the lengths of the gaps are adapted to ensure that the waists of the light beams are focused on the respective controllable elements along the diagonal line.

10. The optical switch according to claim 9, wherein each gap is in air.

11. The optical switch according to claim 9, wherein each gap is in glass.

12. The optical switch according to claim 11, wherein all of the gaps are formed out of a single piece of wedge-shaped glass.

13. The optical switch according to claim 2, wherein a plurality of the focusing lenses have different focal lengths; wherein the focal lengths of the focusing lenses gradually increase from one end of the second array to the other corresponding to the focal lengths of the collimating lenses.

14. The optical switch according to claim 13, wherein one or more of the focusing lenses comprises a graded index lens.

15. The optical switch according to claim 14, wherein a plurality of the graded index lenses have different lengths; and wherein the lengths of the graded index lenses gradually decrease from one end of the second array to the other to ensure efficient coupling of the light beams.

16. The optical switch according to claim 14, wherein a gap is provided between a plurality of the graded index lenses and the output waveguides; wherein a plurality of the gaps have different lengths; and wherein the gaps gradually increase from one end of the second array to the other to ensure efficient coupling of the light beams.

17. The optical switch according to claim 7, wherein a plurality of the focusing lenses have different focal lengths; and wherein the focal lengths of the focusing lenses gradually increase from one end of the second array to the other corresponding to the focal lengths of the collimating lenses.

18. The optical switch according to claim 17, wherein a plurality of the focusing lenses are graded index lenses.

19. The optical switch according to claim 18, wherein a plurality of the graded index lenses have different lengths; wherein the lengths of the graded index lenses gradually decrease from one end of the second array to the other; wherein a gap is provided between a plurality of the graded index lenses and their corresponding input waveguides; wherein a plurality of the gaps have different lengths; and wherein the gaps gradually increase from one end of the second array to the other; whereby the lengths of the lenses and the lengths of the gaps are adapted to ensure that light beams are coupled efficiently.

20. A method of switching light beams between a first substantially-linear array of collimating lenses, defining input ports, to a second substantially-linear array of focusing lenses, defining output ports, via a two-dimensional array of M×N controllable elements aligned between the two arrays of lenses at respective intersection points of the light beams, whereby in a first state a controllable element will redirect light from an input port to an output port, and whereby in a second state the controllable element allows light to pass unobstructed, each light beam having a waist along its length, at which the beam's diameter is at a minimum; wherein a plurality of the collimating lenses, which transmit light beams via a P×P array of the controllable elements, are adapted to focus the waists of the light beams being transmitted thereby on the corresponding controllable elements, which are disposed along a diagonal line extending across the P×P array of the controllable elements, wherein P≦the lesser of M and N.

21. The method according to claim 20, wherein a plurality of the waists have substantially equal diameters.

22. The method according to claim 21, wherein a plurality of the focusing lenses is adapted similarly to their respective collimating lenses.

23. The method according to claim 21, wherein the collimating lenses are grin lenses having a gap between the lenses and each input waveguide, and the method includes adapting the gaps and the lengths of the lenses, whereby the waists have substantially equal diameters.

24. The method according to claim 23, wherein the focusing lenses are grin lenses having a gap between the lenses and each input waveguide, and the method includes adapting the gaps and the lengths of the lenses, whereby the waists have substantially equal diameters.

\* \* \* \* \*